Figures 1, 2:
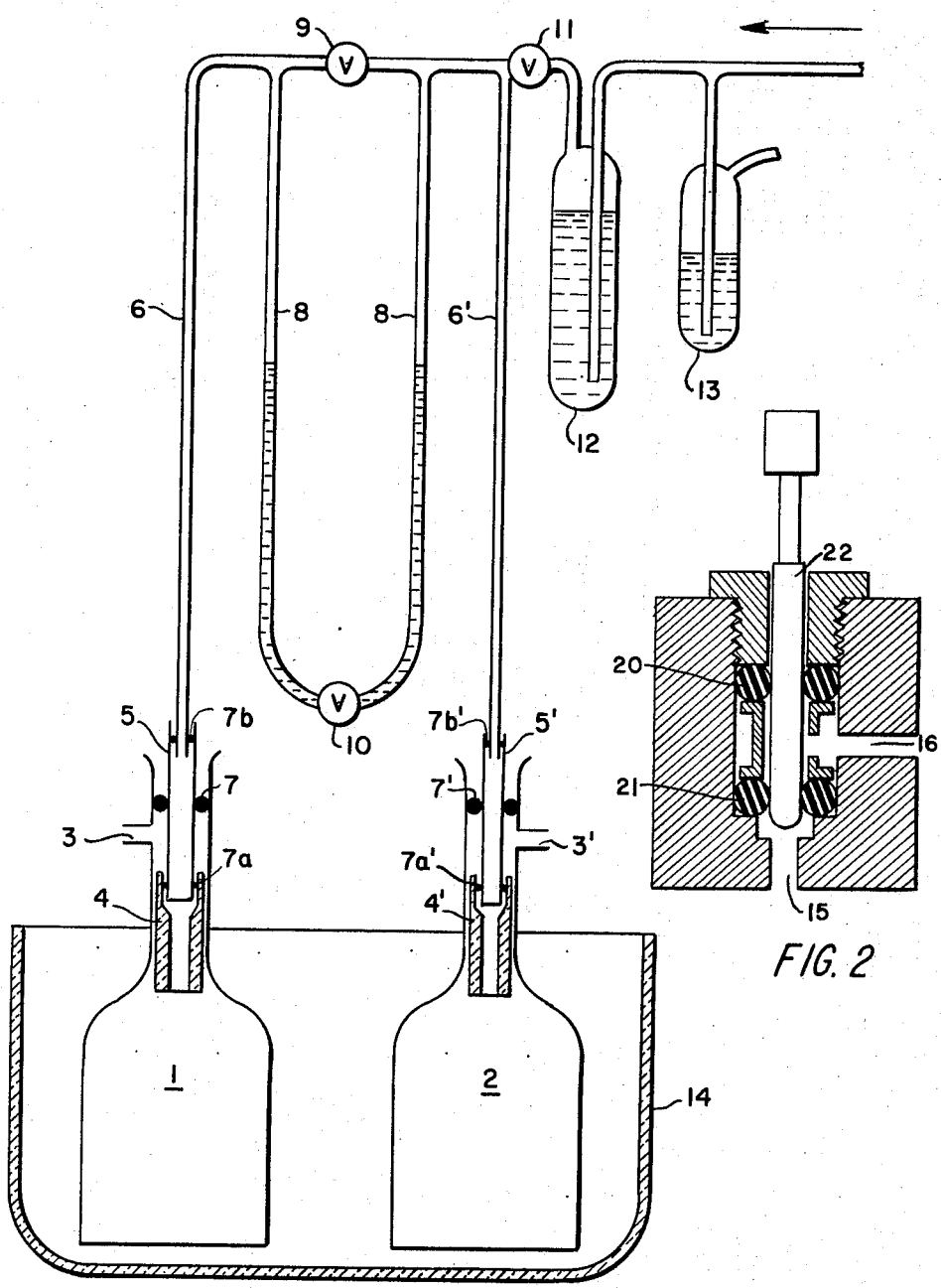

United States Patent Office 3,299,713
Patented Jan. 24, 1967

3,299,713
METHOD AND APPARATUS FOR DETERMINING THE SURFACE AREA OF FINELY DIVIDED SUBSTANCES BY GAS ADSORPTION
Robert Haul, Bonn, and Gerd Dümbgen, Ludwigshafen, Friesenheim, Germany, assignors to Ströhlein & Co., Dusseldorf, Germany, a corporation of Germany
Filed June 22, 1964, Ser. No. 376,707
3 Claims. (Cl. 73—432)

Our invention relates to a method and apparatus for measuring the surface area of finely divided substances, such as adsorbents, catalysts, pigments, fillers, fertilizers, insecticides, ceramics and other pulverized or granular materials.

Heretofore known as a standard process for such surface measurements has been the method of Brunnauer, Emmett and Teller, the so-called BET-process. The measurement is based on nitrogen adsorption at low temperatures. From the experimentally obtained adsorption isotherm the number of normal cubic centimeters of nitrogen ($V_m$), is determined which is required to cover the unit quantity of the particular specimen with a monomolecular adsorption layer. This permits to calculate the number of nitrogen molecules (Z) adsorbed in the complete monomolecular layer, taking into account the mole volume of the gases (V) and the Loschmidt (Avogadro) number ($N_L$):

$$Z = \frac{V_m \cdot N_L}{V}$$

If the area of an individual adsorbed nitrogen molecule ($\delta N_2$) is known, the specific surface area ($S_g$) is thus determined by:

$$S_g = Z \cdot \delta N_2 \left[\frac{cm^2}{g}\right]$$

For routine measurements of surface areas in practice, however, this method is excessively time-consuming.

Various modifications of the original BET set-up (Journal American Chemical Society, vol. 60, pages 309–319, 1938) have, therefore, been suggested. It has been attempted, particularly, to reduce the amount of skilled labor for servicing the adsorption apparatus during the time-consuming measuring operations and for evaluating the experimental results. Accordingly, several automatic measuring devices have been described.

Among these is an apparatus which comprises a gas supply container connected through two capillaries with two measuring vessels of which one contains the specimen to be investigated. In order to perform the measurement the determination of a differential as well as an absolute pressure is necessary to observe both the change in absolute pressure within the measuring vessel and the pressure difference between the two vessels during the adsorption process. The measurements are automatically plotted by means of a recording instrument (Schlosser, Chemie Ingenieur Technik, vol. 31, 1959, page 799).

Aside from the above-mentioned method based on volumetric measurements, there have become known devices for measuring adsorption processes using a gravimetric principles (Sandstede and Robens, Chemie Ingenieur Technick, vol. 32, 1960, page 413; Kassner, Staub, vol. 22, 1962, page 123) or a continuous flow principle (Nelson and Eggertsen, Analytical Chemistry, vol. 30, 1958, page 1387). These methods, however, also have the disadvantage of being excessively time-consuming and/or requiring very expensive equipment.

Some time ago we described a considerably simplified method performable with customary laboratory equipment (Chemie Ingenieur Technik, vol. 32, 1960, page 349). This apparatus, too, requires the separate determination of a pressure difference as well as an absolute pressure. The mercury manometer used for measuring the equilibrium pressure, complicates the design and use of the apparatus. For obtaining a constant volume on the side of the measuring vessel, the mercury level must be adjusted to a given marker each time when the measuring gas is introduced and at the end of the adsorption process. This involves additional manipulations, such as lifting and lowering a level-control vessel or adjusting another, corresponding device, while the proper position of several valves has to be kept under observation. These are serious disadvantages for the use of the apparatus in industrial practice. When the prescribed order of manipulations is not observed, the measuring result may be faulty, or mercury from the manometers as well as oil may reach the capillaries or measuring vessels. Furthermore, the presence of the absolute-pressure manometer results in an asymmetrical design of the apparatus which makes it difficult to preserve the measuring principle, viz. maintenance of equal volumes on both sides of the differential manometer, and requires additional means for volume equalization. In addition, the use of mercury manometers is generally undesirable for reasons of health, particularly in equipment from which gases are issued into the ambient atmosphere. The necessarily long and wide mercury manometers also involve danger of breakage; but other pressure-measuring devices are not conceivable if expensive equipment is to be avoided.

It is an objective of our present invention to devise a measuring method and apparatus that minimizes or avoids the above-mentioned shortcomings and disadvantages.

More particularly, it is an objective of the invention to provide an apparatus for measuring the surface area of finely divided substances which enables the use of a differential manometer also for the determination of the absolute pressure.

Another objective is to provide a measuring device of the above-mentioned type which is symmetrical with respect to the differential pressure manometer, thus minimizing the errors resulting from the fact that with an asymmetrical apparatus unequal parts of the volume on each side of the manometer remain outside of the cooling bath.

It is also an objective of our invention to provide a measuring apparatus of the type mentioned which eliminates the need for a pressure-measuring device in order to determine the equilibrium pressure.

To achieve these objectives and advantages, as well as those mentioned hereinafter, and in accordance with a feature of our invention, we use two vessels, one of which contains the specimen the other serving for comparative purposes. The vessels which have substantially the same volume are both provided with seals and adapted for joint insertion into a temperature bath. We further provide a manometer of the differential type having two legs and equip it with valve means for blocking the legs from each other. The two vessels are connected with the two manometer legs by a symmetrical system of tubes which comprises capillaries inserted into the neck portions of the respective two vessels.

Since the volume of the comparative vessel is known, the gas pressure resulting from the cooling operation can be calculated on the basis of the gas law, taking into account the volumetric change due to the displacement of the manometer liquid. Since, therefore, with the knowledge of the initial pressure of the gas before cooling, supplied at atmospheric pressure, the resulting pressure in the comparative vessel at the low temperature is known, the equilibrium pressure in the vessel containing the specimen can also be determined from the measured differential pressure.

By virtue of the invention, the apparatus as well as the measuring operation are decisively simplified. This is because in contrast to the previously known measuring apparatus based upon the BET-method, the equipment according to the present invention avoids the use of a pressure-measuring device for determining the equilibrium pressure.

FIG. 1 of the drawing shows an embodiment of apparatus according to the invention by way of example; and FIG. 2 is a sectional view of a piston valve of the apparatus.

The illustrated apparatus comprises a comparative vessel 1 and a measuring vessel 2 for the specimen. The two vessels have the same volumetric content, for example 100 cm.³. The neck of the flask-like vessels, preferably made of glass, consists of a tube having an exactly calibrated inner diameter. The neck has a length of 150 mm. and an inner width of 9 mm., for example. Near the upper end, the neck of each vessel is provided with a lateral outlet tube 3, 3' open to the ambient atmosphere. Capillary tubes 4 and 4', for example of 2 mm. inner diameter, are located in the neck portion and have such an outer diameter that the interspace between the capillaries and the vessel wall is as narrow as feasible. The capillaries are gas-tightly connected through respective adapters 5, 5' with connecting tubes 6, 6' which form part of a symmetrical tube system. The connection of the adapters 5, 5' with the connecting tubes 6, 6' and the capillaries 4, 4' is effected with the aid of sealing rings 7, 7a, 7b, and 7', 7a', 7b'. By suitably placing the sealing rings 7 and 7', the vessels 1, 2 can be alternatively connected with the ambient atmosphere or be sealed from the atmosphere, simply by shifting the necks of the vessel over the sealing rings which remain in fixed positions, e.g., in grooves of the adapters. If desired, a valve may be connected with each of the lateral outlet tubes 3, 3', so that the vessels can be connected with the ambient atmosphere or separated therefrom without requiring the displacement of the vessels.

The apparatus is provided with a differential manometer 8 of generally U-shaped type which serves to measure pressure differences between the vessels 1 and 2. However, also other types of differential manometers than liquid filled U-tubes can be used. The vessels can be separated or connected with each other by means of a valve 9. The manometer 8 is filled with a liquid of sufficiently low vapor pressure, for example silicone oil or dibutylphthalate. A valve 10 located in the lower part of the manometer permits separating the two legs from each other. The valve 10 is opened only during the measurement of the differential pressure and, when closed, prevents the relatively large pressure difference, temporarily occurring during cooling and heating of the vessels 1 and 2, from causing the manometer liquid to overflow into other portions of the apparatus.

The entire apparatus described so far can be closed by means of a shut-off valve 11. Communicating with the valve and located in the gas flow ahead of the valve is a drying tube 12 filled with an adsorption agent, for example blue gel and a bubble counter 13 which simultaneously serves as an over-pressure valve and is filled with a liquid of low specific gravity and low vapor pressure, such as silicone oil or dibutylphthalate.

The valves of the apparatus, as shown in FIG. 2, are designed as piston valves comprising a movable cylindrical piston 22 and two stationary sealing rings 20 and 21 in the gas or liquid line 15, 16.

The measuring method is performed, for example, as follows.

A suitable quantity of the specimen to be investigated, viz. about 0.05 to 5 g. depending upon the surface area of the material, is weighed into the measuring vessel 2. A stream of gas used for the measurement is flown through the vessel, preferably at elevated temperature. After cooling to room temperature, the measuring vessel 2 with the specimen is fastened to the connecting tube 6' with the aid of the adapter 5' so that the sealing ring 7' is located above the lateral outlet 3'. The comparative vessel 1 is connected in the same manner to the connecting pipe 6. With valve 11 closed, the measuring gas, preferably commercial but purified nitrogen, is introduced so that it escapes through the over-pressure valve 13 with a regular sequence of bubbles. With valves 9 and 10 open, the valve 11 is now also opened so that the measuring gas passes into and through the apparatus from which it escapes through the outlets 3 and 3'. For maintaining a uniform temperature, the two vessels 1, 2 are kept immersed in a water bath 14 of room temperature.

After some time, the vessels 1 and 2 are shifted in such a way that the sealing rings 7 and 7' are placed below the respective outlets 3 and 3'. This separates the two vessels from the ambient atmosphere. Now the gas flow is closed off, and the valves 11, 9 and 10 are closed in the sequence just given. Thereafter, the water bath 14 is removed and the two vessels 1, 2 are immersed into a Dewar vessel containing liquid nitrogen, down to a marker at the vessel neck. As a result, a pressure difference is caused between the comparative vessel 1 and the measuring vessel 2, due to the fact that a certain quantity of gas becomes adsorbed on the surface of the specimen contained in the measuring vessel. After a few minutes, the valve 10 is slowly opened and the pressure difference read off on the manometer 8. The surface area of the specimen is then evaluated from the pressure difference by calculation or with the aid of a nomogram.

At the end of a measurement, the valve 10 is closed, the valve 9 opened, and the cooling bath removed. The vessels are then heated to room temperature by immersion in a water bath. The measuring vessel 2 can then be exchanged for a new vessel containing another specimen, and the next following measurement can be started.

Using certain simplifications which, however, are of no significance for the accuracy of the results obtained in practice, the specific surface area $S_g$ [m.²/g.] of the specimen being investigated can be determined from the pressure difference $\Delta h$ [mm. oil] indicated on the oil manometer 8, and from the equilibrium pressure $p$ [torr] by means of the following equation:

$$S_g = 2 \cdot 10^{-3} \frac{(785-p)\Delta h}{m}(K_1 + K_2 p)$$

wherein $m$ denotes the weighed-in quantity of the specimen in gram, and $K_1$, $K_2$ apparatus constants. The equilibrium pressure $p$ [torr] results in sufficient approximation from $$p = C_1 p_B - C_2 \Delta h,$$

wherein $p_B$ denotes the initial pressure [torr] at which the gas is filled in, and $C_1$, $C_2$ are constants in accordance with the following terms:

$$C_1 = \frac{V+V_x}{V\frac{T_z}{T_k}+V_z+V_x} \quad C_2 = \frac{\rho \text{ oil}}{\rho \text{Hg}}$$

In these equations:

$V$ = volume of the adsorption and comparative vessel respectively with inserted capillary when the vessels are immersed in the cooling bath to one-half of the height of the vessel neck $V \approx 100$ cm.³.

$V_z$ = volume of the adsorption or comparative side from one-half the height of the vessel neck to the zero position of the manometer. This volume remains at room temperature during the measurement. $V_z \approx 5$ to 10 cm.³.

$T_z$ = room temperature [° K.].

$T_k$ = temperature [° K.] of the cooling bath.

$V_x$ = volume change in one leg of the oil manometer during the measurement = $r^2 \pi \Delta/20$ [cm.³].

$\rho$ oil = density of the manometer oil at 22° C.

$\rho$ Hg = density of the mercury at 22° C.

The method and apparatus according to the invention particularly exhibit the following advantageous properties:

(1) In comparison with other measuring devices heretofore available, the apparatus and the method of measurement is greatly simplified.

(2) The apparatus is readily transportable, particularly easy to use, and does not require a vacuum pump.

(3) A large number of measurements can be performed and evaluated rapidly, this being especially desirable for industrial testing laboratories.

(4) The measuring results have an excellent reproducibility and an accuracy at least equal to that obtainable with the known but considerably more complicated equipment.

(5) On account of the differential arrangement, the apparatus is also suitable for materials with relatively small surface areas ($\sim$1 m.$^2$/g.).

We claim:

1. Apparatus for the determination of the surface area of finely divided materials by gas adsorption comprising two vessels of substantially the same volume, one of which containing the specimen the other serving for comparative purposes, said vessels being provided with sealing means and being connected to a tube system by means of respective capillaries closely fitting into the neck portions of each of said vessels, said tube system provided with a valve for separating it from the ambient atmosphere and comprising a differential manometer connected in a symmetrical arrangement between said two vessels, said differential manometer comprising a U-shaped tube containing a liquid of sufficient low vapour pressure, a conduit connected between the two legs of said U-shaped tube above the level of the liquid, and valve means in said conduit for alternatively blocking and providing communication between said two legs and said vessels.

2. Apparatus for the determination of the surface area of finely divided materials by gas adsorption comprising two vessels of substantially the same volume, one of which containing the specimen the other serving for comparative purposes, said vessels being provided with sealing means and being connected to a tube system by means of two adapters and sealing rings in such a way as to permit a convenient and flexible attachment of said vessels, said adapters being connected with respective capillaries closely fitting into the neck portions of each of said vessels, said tube system provided with a valve for separating it from the ambient atmosphere and comprising a differential manometer connected in a symmetrical arrangement between said two vessels and provided with valve means for blocking said two vessels from each other, said differential manometer consisting of a U-shaped manometer filled with a liquid of sufficient low vapour pressure, said manometer being provided with valve means for blocking the liquid in the two legs of the U-shaped manometer, said valves being piston valves comprising a movable piston and stationary sealing rings.

3. The method of determining the surface area of finely divided material by gas adsorption which comprises placing a known quantity of the specimen into one of two vessels having the same volume and respective upwardly extending neck portions, connecting said two neck portions symmetrically with the two sides of a differential manometer by means of respective capillaries closely fitting into the neck portions of the vessels, flowing the measuring gas at a suitable elevated temperature through the vessel containing the specimen for such a period of time as to ensure the displacement of adsorbed molecules other than those of the measuring gas from the surface of the specimen and then placing both vessels into a room-temperature bath while continuing the flow of the measuring gas through the vessels into the atmosphere, discontinuing the gas supply by means of a valve after both vessels have reached thermal equilibrium in the temperature bath, sealing the vessels from the atmosphere and blocking the two sides of the differential manometer from each other, removing the bath and cooling the vessels to a suitable low temperature whereby the resulting pressure difference indicated by the differential manometer is indicative of the specific surface area of the specimen.

References Cited by the Examiner
UNITED STATES PATENTS
3,059,478  10/1962  Coggeshall et al. _____ 73—432

DAVID SCHONBERG, *Primary Examiner.*